No. 657,028. Patented Aug. 28, 1900.
R. R. PACE.
COTTON PRESS.
(Application filed Mar. 30, 1899.)
(No Model.) 2 Sheets—Sheet 1.
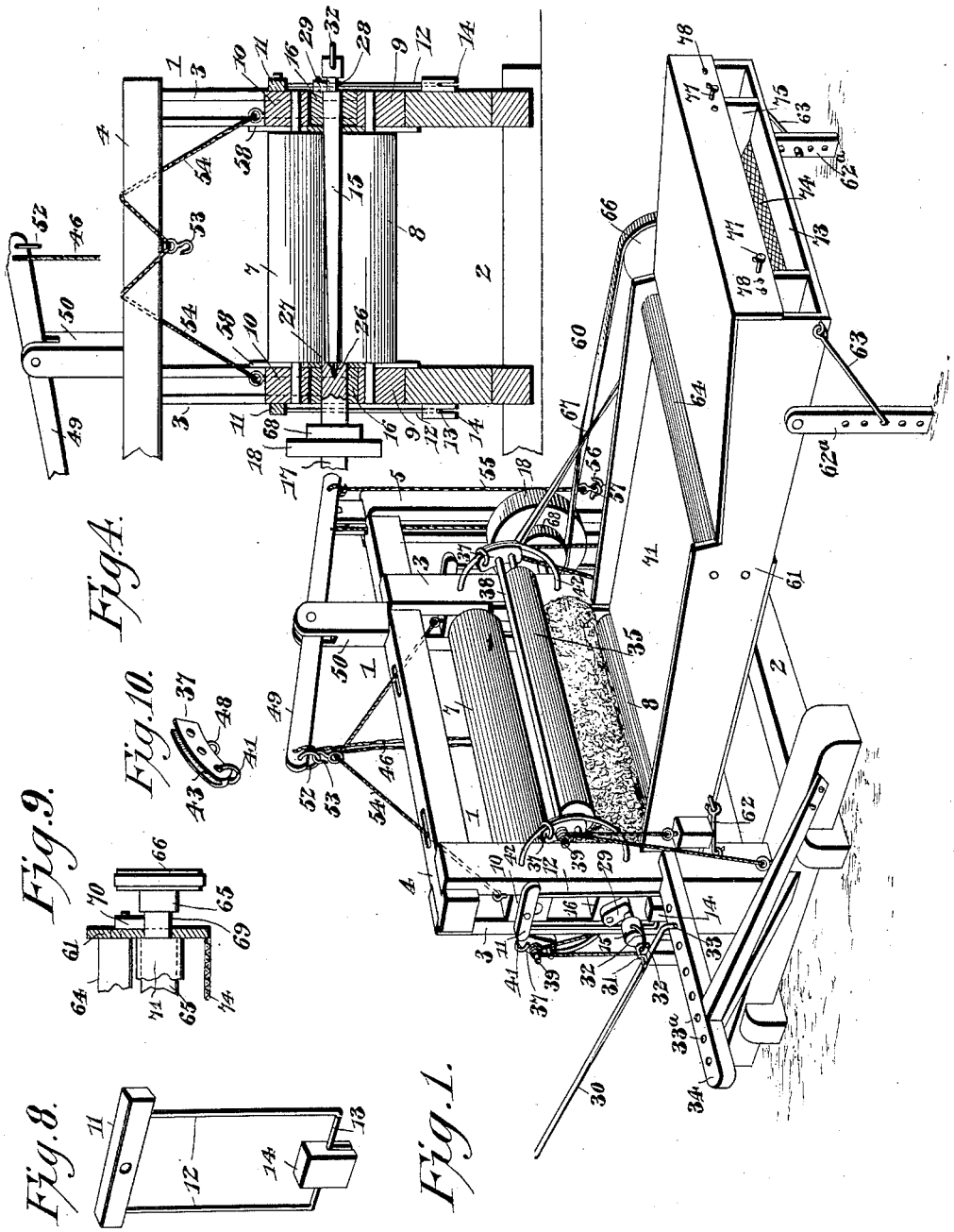
Witnesses
Jas. K. McCathran
D. T. Hollaupted
Richard R. Pace, Inventor
By his Attorneys
C. A. Snow & Co.

No. 657,028. Patented Aug. 28, 1900.
R. R. PACE.
COTTON PRESS.
(Application filed Mar. 30, 1899.)
(No Model.) 2 Sheets—Sheet 2.
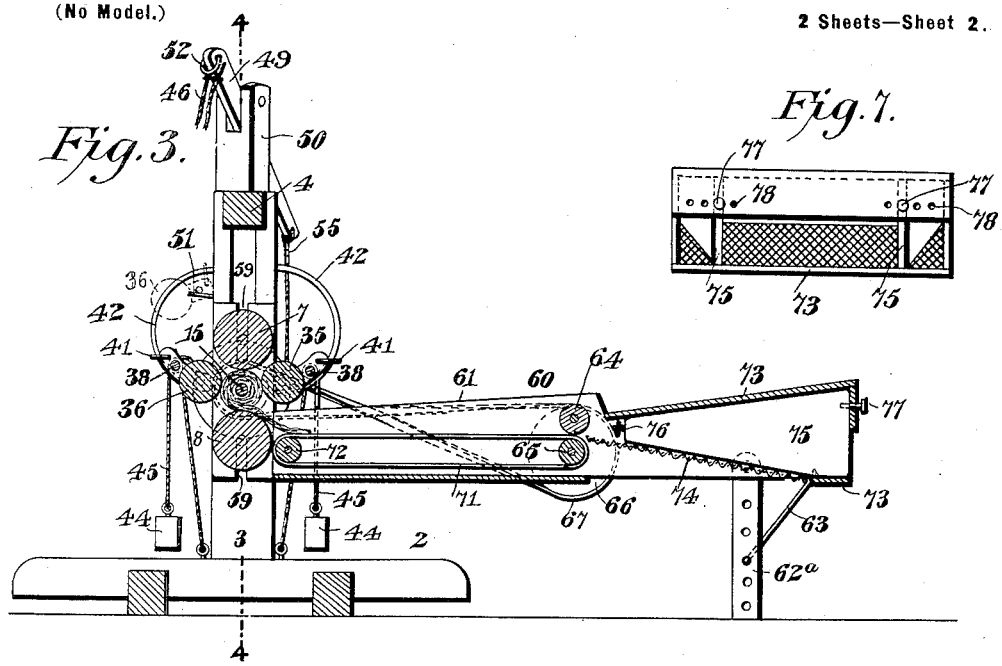
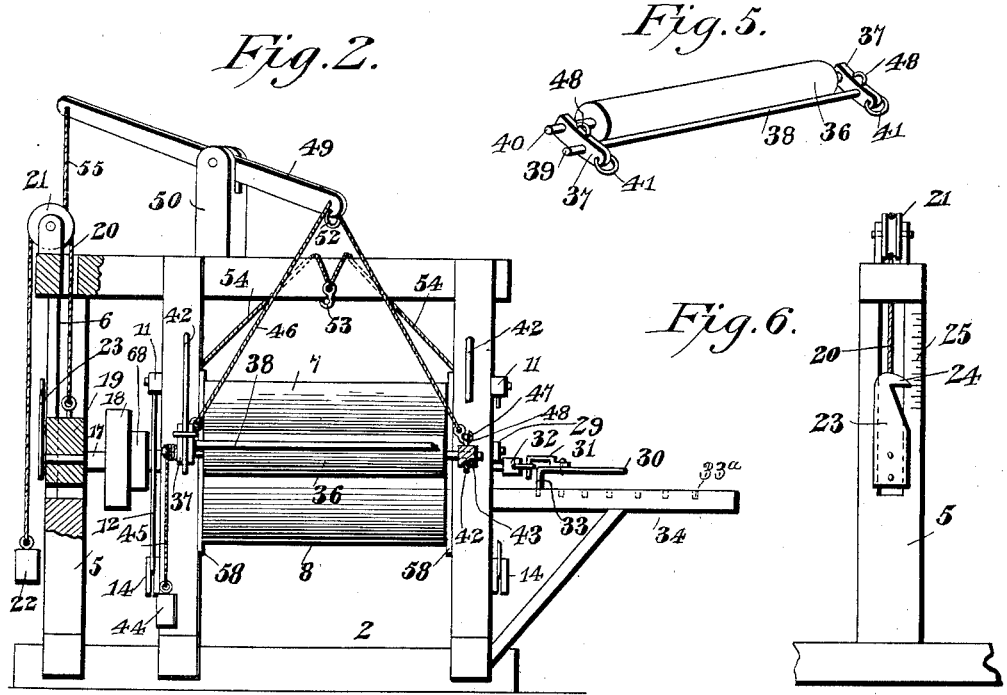
Witnesses Richard R. Pace, Inventor
By his Attorneys,

UNITED STATES PATENT OFFICE.

RICHARD R. PACE, OF HOMER, LOUISIANA.

COTTON-PRESS.

SPECIFICATION forming part of Letters Patent No. 657,028, dated August 28, 1900.

Application filed March 30, 1899. Serial No. 711,100. (No model.)

*To all whom it may concern:*

Be it known that I, RICHARD R. PACE, a citizen of the United States, residing at Homer, in the parish of Claiborne and State of Louisiana, have invented a new and useful Cotton-Compress, of which the following is a specification.

This invention relates to cotton-compresses for making cylindrical or round bales of cotton; and it has for its object to provide a new and useful machine of this character having simple and efficient means for forming a uniform cylindrical bale of any required density.

To this end the invention primarily contemplates a novel arrangement of compression and pressure rolls whereby a steady and uniform pressure will be exerted against the bale during its growth and which pressure may be regulated or graduated according to the particular density required.

A further object of the invention is to provide the press with an improved condenser and feeder attachment capable of use in connection with any size of gin and having means for condensing and forming the cotton into a bat of the proper width and feeding the latter continuously to the pressing mechanism during the operation of forming the bale.

With these and other objects in view, which will readily appear as the nature of the invention is better understood, the same consists in the novel construction, combination, and arrangement of parts hereinafter more fully described, illustrated, and claimed.

The fundamental features of the invention are necessarily susceptible to a wide range of modification; but the preferred embodiment of the improvements is shown in the accompanying drawings, in which—

Figure 1 is a perspective view of a cotton-compress embodying the several improvements contemplated by the present invention and showing the upper compression-roll elevated to an inactive position to permit the removal of the completed bale from the press. Fig. 2 is a rear elevation of the machine, showing the lifting-ropes connected with the bearing-shoes for the side pressure-roll at the rear side of the machine. Fig. 3 is a vertical longitudinal sectional view of the compress, showing in dotted lines the side pressure-roll at the rear side of the machine elevated to a position which permits clearance for the completed bale as it is discharged from the press. Fig. 4 is a vertical transverse sectional view of the compress on the line 4 4 of Fig. 3. Fig. 5 is a detail in perspective of one of the weighted side pressure-rolls and its slidable bearing-frame. Fig. 6 is a detail elevation of one side of the machine, showing the indicator attachment for indicating the size and weight of the bale to be formed. Fig. 7 is a detail end view of the condenser and feeder attachment, showing the adjustment for the adjustable walls within the flue-box. Fig 8 is a detail in perspective of one of the weight-supporting yokes for the movable compression-roll. Fig. 9 is a detail sectional view showing the fastening for the lower condensing-roll. Fig. 10 is an enlarged detail in perspective of one of the bearing-shoes for the side pressure-rolls.

Referring to the accompanying drawings, the numeral 1 designates an upright press-frame having a suitable base 2 and essentially comprising a pair of oppositely-arranged parallel longitudinally-slotted standards 3, and a horizontal cross-beam 4, connecting the upper ends of said standards. The frame is further provided at one side of and parallel with one of the main standards 3 thereof with a supplemental upright standard 5, arising from the base 2 of the frame and joined at its upper end to an extension of the upper cross-beam 4, and the said supplemental standard 5 is provided with a longitudinal dovetailed guide-slot 6 therein, the function of which will be presently referred to in connection with the parts associated with the supplemental standard 5 and the adjacent main standard 3 of the frame.

Between the main upright slotted standards 3 of the frame is arranged a pair of horizontal vertically-alined superposed compression-rolls 7 and 8, disposed one above the other and relatively movable toward and from each other to provide for the formation between the same of a cylindrical bale of cotton which increases or grows in size as the baling operation continues. In carrying out the present invention the lower compression-roll 8 is supported to rotate in a fixed plane, and the opposite spindle or shaft extremities of this roll are journaled in stationary bearing-boxes 9, fitted to the opposite upright frame-standards 3, while the spindle or shaft extremities of the upper compression-roll 7 are journaled in the slidable bearing-boxes 10, fitted to slide within the longitudinal slots of the standards 3, whereby the upper compression-roll 7 while being permitted to have a free rotation is also free to move in a direction toward and away from the lower compression-roll 8.

It is necessary that the upward movement of the movable compression-rolls 7 in a direction away from the fixed rotating compression-roll 8 be resisted under pressure to provide for giving a proper density to the bale being formed, and while several expedients may be utilized to accomplish this result the said movable roll 7 is preferably weighted in the manner shown in the drawings. To provide for properly weighting the upper movable compression-roll 7, the slidable bearing-boxes 10 therefor carry at their outer sides cross-arms 11, to which are fitted the upper ends of approximately U-shaped pendent weight-yokes 12, having at their lower ends the cross-bars 13, supporting thereon removable pressure-weights 14, any number or size of which weights may be employed to provide for increasing or diminishing the density of the bale, as may be required.

Both compression-rolls 7 and 8 are free to rotate under the influence of the revolving roll of cotton therebetween, but have no direct gear or belt connection therewith, as the power for winding the bat into roll form to produce the cylindrical or round bale of cotton is applied directly to the revoluble and withdrawable core-rod 15 upon which the bale is formed, and which core-rod is interposed between both compression-rolls 7 and 8 and at all times during the operation of the press is equidistant from each of said rolls.

The core-rod 15 is supported in its operative position by a pair of oppositely-located slide-boxes 16, fitted to slide within the longitudinal slots of the standards 3 below the slidable bearing-boxes 10 for the upper compression-roll 7, and said slide-boxes 16 not only provide for the revoluble support of the core-rod 15, but one of said slide-boxes 16 also receives and forms a bearing for the inner end of the vertically-movable rotating drive-shaft 17. The drive-shaft 17 carries a band wheel or pulley 18 to receive the drive-belt for transmitting motion to the working parts of the press, and said shaft is interposed between the supplemental upright standard 5 and the adjacent main standard 3, in which is fitted the slide-box 16, which forms a bearing for the inner end of the shaft, the outer end of which shaft is journaled in the vertically-movable dovetailed slide-box 19, fitted to slide in the dovetailed guide-slot 6 of the supplemental standard 5, thereby completing a bearing-support for the drive-shaft 17, which permits the same to adjust itself in unison with the core-rod as the bale increases in size. To provide for counterbalancing the weight of the drive-shaft and its attachments, the slide-box 19 for the outer end thereof has attached thereto one end of a weight-rope 20, which passes over a supporting-pulley 21, journaled at the upper end of the supplemental standard 5, and the other end of which weight-rope has suspended therefrom a counterbalance-weight 22, which prevents the weight of the drive-shaft and the parts associated therewith from interfering with the self-adjustment of the core-rod during the growth of the bale.

The sliding movement of the bearing-box 19 for the outer end of the guide-shaft is utilized to indicate the size and weight of the bale to be formed, and to provide for this the said slide-box has fastened to the outer side thereof, so as to be movable therewith, a pointer 23, having an index-finger 24 playing over a graduated-scale 25, arranged on the outer face of the supplemental frame-standard 5. By reason of the construction described it will be obvious that the operator can approximately determine by observing the scale 25 the weight of the bale being formed, and hence can stop the operation of the press when any desired density or size has been reached.

The inner end of the drive-shaft 17, which is journaled in one of the slide-boxes 16, has formed therein a squared socket 26 to receive the correspondingly shaped and tapered tenon 27, formed at one end of the revoluble and withdrawable core-rod 15, so that when said core-rod is in position the same will rotate with the drive-shaft, and consequently wrap upon itself the bat of cotton which is fed between the upper and lower compression-rolls in the manner to be presently explained. Adjacent to its outer end the withdrawable core-rod 15 has an annular groove 28, which is adapted to loosely receive one end of a locking dog or arm 29, which is pivotally mounted on the outside of the slide-box 16, in which turns the outer end portion of the core-rod. When the locking dog or arm 29 is turned into the annular groove 28, the core-rod is prevented from longitudinal displacement, while at the same time being permitted to freely rotate with the drive-shaft and the bat of cotton. By turning the locking dog or arm 29 out of the groove 28 the core-rod is then left free to be extracted or withdrawn from the completed bale through the medium of the extracting-lever 30. The said extracting-lever 30 is provided with a hook 31, adapted to be engaged in the loop or eye 32, located at the outer end of the core-rod 15, and said lever is further provided with a fulcrum pin or stud 33, adapted to be successively engaged in the longitudinal series of bearing-openings 33ª, formed in the stationary bracket 34, extended horizontally from one side of the press-frame and in substantial parallelism to the core-rod when supported in its operative position. It will be observed that when the hook 31 of the extracting-lever is engaged with the loop or eye of the core-rod it is simply necessary to insert the fulcrum pin or stud successively in the different bearing-openings 33ª to provide for the complete extraction or withdrawal of the core-rod from the completed bale to permit the latter to be discharged from the press.

Coöperating with the upper and lower compression-rolls 7 and 8 is a pair of oppositely-located side pressure-rolls 35 and 36, respectively arranged upon opposite sides of the press-frame and at one side of the vertical plane of the rolls 7 and 8 and the core-rod therebetween. Each of the side pressure-rolls 35 and 36 is mounted in a slidable bearing-frame consisting of a pair of oppositely-located segmental bearing-shoes 37 and a tie-rod 38, connecting the pair of shoes 37 and having terminal extensions 39, projecting beyond the outer sides thereof. The bearing-shoes 37 of each slidable bearing-frame have bearing-openings which loosely receive the spindle extremities 40 of the pressure-rolls, thus permitting the rolls to freely rotate with the bale against which it is held, and the said bearing-shoes are further provided at their outer ends with slide-loops 41, loosely embracing semicircular guide-yokes 42, fitted to and extended outwardly from opposite sides of each of the main-frame uprights or standards 3. The slide-loops 41 therefore serve to hold the bearing-shoes 37 within their respective guide-yokes 42, and to insure a proper engagement of the shoes with said yokes the shoes are provided in their lower sides with longitudinal grooves 43, which receive therein the yokes 42.

The slidable bearing-frames carrying the side pressure-rolls 35 and 36 are normally held within the lower ends of the semicircular guide-yokes 42 by means of pressure-weights 44, suspended from one end of weight-ropes 45, wrapped upon the terminal extensions 39 of the tie-rods 38 and secured fast at their opposite ends to fixed points of attachment on the base of the press-frame. By reason of wrapping the pressure or weight ropes 45 upon the extended ends or terminals 39 of the tie-rods the said ropes and their weights constitute pressure mechanism for holding the side rolls 35 and 36 under pressure against the opposite sides of the bale being formed between the upper and lower compression-rolls, and by increasing or diminishing the number of wraps of the ropes 45 upon the ends of the tie-rods the pressure of the side rolls 35 and 36 against the bale may be increased or diminished, according to the required density of the bale to be formed. During the growth of the bale the bearing-shoes 37 for the side pressure-rolls slide upward within and against the semicircular guide-yokes 42 through the arc of a circle, so as to always retain their same relative positions against the sides of the bale, and when the bale has been completed it is necessary to place the side pressure-roll 36 at the rear side of the machine in a position which permits clearance for the bale, and to accomplish this there is employed a pair of lifting-ropes 46, carrying at their ends hooks 47, adapted to be detachably engaged with the eyes 48, fitted to the upper sides of the bearing-shoes 37 for the rear pressure-roll 36. By having the side pressure-rolls automatically movable at opposite sides in arcs of circles by means of the guide-yokes 42 and the bearing-shoes connected to the rolls the said rolls are permitted to maintain a pressure on the bale being formed at diametrically-opposite points having a substantially-invariable location as regards the contact of the said rolls with the bale, and thus materially aid in producing a truly-cylindrical bale of uniform density, the movement of the rolls being proportionate to the elevation of the upper roll directly over the bale. The said lifting-ropes 46 are suspended from one end of a lifting-lever 49, mounted within a supporting-block 50, arranged on top of the press-frame, and which when depressed by the operator lifts up the bearing-frame carrying the pressure-roll 36 and enables the said frame to be placed upon the offstanding supporting-pins 51, projected from the rear sides of the main-frame uprights or standards 3. When supported upon the pins 51, the pressure-roll 36 at the rear side of the press is held out of the way, so as to permit a free delivery of the completed bale after the withdrawal of the core-rod. It is also necessary to elevate the upper compression-rolls 7 to an inactive position after the wrapping and tying of the completed bale to permit of the discharge thereof from the press, and the lifting-lever 49 is utilized for this purpose, as well as for lifting the rear pressure-roll 36 to the position just described. The said lever 49 is provided at one end with a loop or ring 52, into which is detachably hooked the hook 53, connected with the lifting-ropes 54, strung through suitable guide-openings formed in the top cross-beam of the press-frame and fastened at their lower ends, respectively, to the opposite slidable bearing-boxes 10 for the upper movable compression-roll 7. With the hook 53 engaged in the ring 52 at one end of the lifting-lever 49 a depression at the opposite end of the lever will lift the upper compression-roll to an inactive position, in which position it is held by a securing-rope 55, connected to one end of the lever and carrying a hook 56, adapted to be engaged in the eye 57, fitted to the supplemental standard 5 of the press-frame. It will of course be understood that when the press is in operation the lifting-lever is not connected with either the bearing-boxes for the upper compression-roll 7 or with the slidable bearing-frame for the rear pressure-roll 36.

To provide for properly building up the ends of the bale and preventing the cotton from working into the bearings for the two compression-rolls and the interposed core-rod, a pair of oppositely-located sliding guard-plates 58 are employed. The said guard-plates are secured, respectively, to the inner sides of the oppositely-located slide-boxes 16, so as to be movable therewith, and are provided with longitudinal slots 59 in their ends to receive the spindle or shaft extremities of the compression-rolls. The said guard-plates are made of a sufficient length to extend the full width of the ends of the bale at all times during its growth.

In connection with the pressing mechanism there is employed a combined condenser and feeder attachment 60, which provides for taking the lint-cotton directly from the gin, forming it into a bat of proper width, and then feeding the bat to the core-rod 15, between the compression-rolls. The said attachment essentially consists of a rectangular frame 61, having a detachable hook-and-eye connection 62 at one end with the front side of the press-frame contiguous to the lower fixed compression-roll 8 and supported at its outer end on the folding legs $62^a$, said legs having adjustably connected therewith the adjusting brace-hooks 63, loosely connected to the sides of the frame 61 and providing means for holding the said frame in proper position for receiving the full output of lint-cotton from the mouth of the gin. At a point intermediate its ends the frame 61 has mounted therein a pair of superposed condensing-rolls 64 and 65, the lower of which condensing-rolls has mounted on one of its shaft extremities a pulley 66, over which passes a driving-belt 67, receiving its motion from a pulley 68, mounted on the driving-shaft 17 for the pressing mechanism. The said lower condensing-roll 65 is also preferably provided in one of its shaft extremities with an annular groove 69, adapted to loosely receive therein one end of a pivotal locking arm or dog 70, having the same action as the locking arm or dog for the core-rod to provide for removably fastening the said roll 65 in place, whereby it may be removed for adjusting the feed belt or apron 71 or for other purposes at any time desired. The said feed belt or apron 71 receives its motion from the lower condensing-roll 65, and also passes over the belt-roller 72, journaled at the extreme inner end of the frame 61 contiguous to the lower compression-roll 8, to provide for delivering the bat of cotton directly to the core-rod between the two compression-rolls.

The outer end portion of the condenser and feeder frame 61 beyond the condensing-rolls 64 and 65 is provided with an inwardly-tapering receiving-flue 73 for the lint-cotton. This inwardly-tapering receiving-flue 73 is provided with a screen-bottom 74, which acts in the capacity of a cleaning-surface for the lint-cotton to permit the latter to free itself from sand, dirt, and other motes before it passes between the condensing-rolls 64 and 65 and is formed into the bat. The flared end of the receiving-flue 73 is adapted to fit directly over the discharge mouth or flue of a cotton-gin, and to adapt the said receiving-flue to any size gin a pair of adjustable walls 75 are employed. The adjustable walls 75 are arranged longitudinally inside of the receiving-flue 73, at opposite sides thereof, and conform in shape to the interior of the flue, and the inner ends of the oppositely-arranged adjustable walls 75 are pivoted or hinged, as at 76, to the inside of the flue, while the outer ends of the walls are free to be adjusted toward or away from each other to provide for varying the inlet-opening of the flue 73 to suit the size of the discharge mouth or flue of the cotton-gin. The adjustable walls 75 are preferably held in their adjusted positions by means of the fastening-pins 77, adapted to be inserted in any one of a series of openings 78, formed in the outer end of the flue 73, and to engage in the outer ends of the walls.

Some of the advantages of the herein-described machine are that the same provides simple and efficient means for forming a uniform cylindrical or round bale of cotton at a minimum expenditure of power, and thereby obviates the objections to the ordinary methods of baling cotton. A further advantage of the machine is that it provides means for uniformly packing and compressing the cotton in one operation and reduces the danger of fire to a minimum by taking the cotton directly from the gin and baling it at a great density. Furthermore, by reason of the employment of a condenser and feeder attachment it is unnecessary to employ the attendant known as the "feeder" or "packer." Other advantages will readily appear to those familiar with the art.

Changes in the form, proportion, size, and the minor details of construction within the scope of the appended claims may be resorted to without departing from the spirit or sacrificing any of the advantages of this invention.

Having thus described the invention, what is claimed as new, and desired to be secured by Letters Patent, is—

1. In a cotton-compress, a pair of relatively fixed and movable compression-rolls, said movable compression-rolls having sliding supports, means for exerting a downward tension on the movable compression-rolls, a revoluble core-rod interposed between the said rolls and regularly tapered from one end toward the other and adapted to be withdrawn from the completed bale through one side of the machine before said bale is removed, and a drive-shaft having an interlocking connection with the said core-rod and also movable in unison with the latter in a vertical direction.

2. In a cotton-compress, an upright frame, a lower fixed compression-roll journaled in the frame, an upper movable compression-roll having sliding supports working in the frame, said sliding supports being provided at their outer sides with cross-arms, pendent weight-yokes suspended from said cross-arm, removable pressure-weights mounted on said yokes, and a withdrawable core-rod, substantially as set forth.

3. In a cotton-compress, a frame having a plurality of slotted uprights, a pair of relatively fixed and movable compression-rolls, the movable compression-rolls having sliding supports working in the uprights, core-supporting slide-boxes mounted in the slotted uprights, a drive-shaft having one end journaled in one of said slide-boxes, and a withdrawable core-rod having an intermediate detachably-interlocking connection with the said drive-shaft, a portion of said rod opposite to that having the interlocking connection with the drive-shaft also having an adjustable engagement with an adjacent leverage-support.

4. In a cotton-compress, the press-frame having a plurality of slotted uprights, a pair of relatively fixed and movable compression-rolls, core-supporting slide-boxes mounted in a pair of the slotted uprights, a supplemental slide-box mounted in one of the uprights, a drive-shaft journaled in said supplemental slide-box and the adjacent core-supporting slide-box, and a withdrawable core-rod having a detachable interlocking connection with the drive-shaft said shaft being movable in unison with the core-rod, substantially as set forth.

5. In a cotton-compress, the press-frame having a plurality of uprights, one of which is provided with a graduated scale, a pair of relatively fixed and movable compression-rolls, a revoluble core-rod having sliding supports mounted in a pair of the uprights, a supplemental slide-box mounted in the upright having the scale, an indicating-pointer fitted to said supplemental slide-box and movable therewith, and a drive-shaft journaled in said supplemental slide-box and the adjacent core-rod support said shaft being movable with the core-rod, substantially as set forth.

6. In a cotton-compress, the frame, a pair of relatively fixed and movable compression-rolls, a revoluble and withdrawable core-rod interposed between said rolls, and provided contiguous to one end with an annular groove, a pivotal locking dog or arm mounted on one of the core-rod supports and adapted to be moved into and out of engagement with said groove, and a core-extracting device arranged contiguous to one end of the core-rod, substantially as set forth.

7. In a cotton-compress, the frame having a stationary offstanding bracket provided with a plurality of bearing-openings therein, the compression-rolls, the core-rod provided at one end with a loop or eye, and an extracting-lever provided with a fulcrum pin or stud adapted to be inserted in the openings of the bracket, and with a hook adapted to engage with the loop or eye of the core-rod, substantially as set forth.

8. In a cotton-compress, the press-frame having extended from opposite sides thereof offstanding semicircular guide-yokes, a pair of upper and lower relatively fixed and movable compression-rolls mounted within the frame, a slidable self-adjusting bearing-frame arranged at each side of the press-frame and consisting of a pair of oppositely-located segmental bearing-shoes slidably engaging the semicircular guide-yokes, and a tie-rod connecting said shoes and extending beyond the outer sides thereof, a side pressure-roll journaled in each of said slidable bearing-frames, and pressure-weights having flexible connections passed around the extended ends of said tie-rods, substantially as set forth.

9. In a cotton-compress, the press-frame having extended from opposite sides thereof offstanding semicircular guides, a pair of upper and lower relatively fixed and movable compression-rolls, a slidable self-adjusting bearing-frame slidably working within the semicircular guides at each side of the press-frame, a side pressure-roll journaled in each of said bearing-frames, and pressure devices connected with each bearing-frame, substantially as set forth.

10. In a cotton-compress, the press-frame having offstanding supporting-pins at the rear side thereof, a pair of upper and lower relatively fixed and movable compression-rolls, self-adjusting bearing-frames arranged respectively at opposite sides of the press-frame and each carrying a pressure-roll, flexible connections with the supports for the movable compression-roll and with the bearing-frame for the pressure-roll at the rear side of the machine, and a lifting-lever common to both sets of connections and adapted to successively elevate to inactive positions the said bearing-frame for the rear pressure-roll, and said movable compression-roll, substantially as set forth.

11. In a cotton-compress, a frame having a stationary offstanding bracket provided with a plurality of bearing-openings therein, compression-rolls, a core-rod provided at one end with a loop or eye, and an extracting-lever provided with a fulcrum pin or stud adapted to be inserted in the openings of the bracket, and a hook to engage the loop or eye of the core-rod.

12. In a cotton-compress, the combination of coacting compression-rolls arranged to form an intermediate bale-forming pocket, the lower roll having a fixed plane of rotation, and the upper one vertically movable in an automatic manner proportionately to the increase in size of the bale being formed and exerting its weight on the formed bale by gravity, side pressure-rolls on opposite sides of said compression-rolls and having a normal tendency in a downward direction toward the bale-forming pocket therebetween and automatically movable outward from said pocket regularly in arc-shaped paths proportionate to the increase in the size of the bale and exerting their weight-pressure at substantially-invariable opposite points on the bale, the upper compression-roll and the said side compression-rolls acting against the resistance of the lower compression-roll having a fixed plane of rotation, means for guiding the said side compression-rolls in arc-shaped paths and means limiting the travel of the side pressure-rolls in upward and outward paths.

13. In a cotton-compress, the combination of compression-rolls arranged in a common vertical plane and providing an intermediate bale-forming pocket, the lower compression-roll having a fixed plane of rotation and the upper one automatically movable in a vertical direction away from and toward its lower companion roll, a core-rod disposed axially in said bale-forming pocket between the compression-rolls, a drive-shaft connected to and movable in unison with the core-rod, side pressure-rolls on opposite sides of the said compression-rolls and having movement in upward and outward paths relatively to the plane of the core-rod, and means for limiting the travel of the side pressure-rolls in their upward and outward movement.

14. In a cotton-compress, the combination of compression-rolls arranged in a common vertical plane and providing an intermediate bale-forming pocket, individually-counterpoised side pressure-rolls on opposite sides of said compression-rolls and movable normally toward the plane of the bale-forming pocket therebetween, and means limiting said side pressure-rolls to movement in arc-shaped paths upward and outward above the axis of the bale-forming pocket between said side compression-rolls, substantially as described.

15. In a cotton-compress, the combination of a pair of upper and lower relatively fixed and movable compression-rolls, a pair of self-adjusting oppositely-located side pressure-rolls, a core-rod removably and rotatably mounted in the pocket between the said rolls, a drive-shaft interlocked and movable in unison with the said core-rod in a vertical direction, a supplemental upright standard, a box mounted in said supplemental standard and having a vertical sliding movement, the said drive-shaft having bearing in the said box in the supplemental standard, an indicator fixed to the outer portion of the said vertically-movable box in the supplemental standard, and means for raising the said box, the indicator coacting with scale-marks on the outer side of the supplemental standard.

16. In a cotton-compress, the combination with coacting compression-rolls, of fixed arched guides, independently-movable frames fitted loosely on said guides to move freely with relation to the compression-rolls, side pressure-rolls journaled in said frames and adapted to travel therewith and to rotate freely therein by frictional contact with a bale, and independent pressure devices connected with said frames, substantially as described.

17. In a roller-compress, the combination with coacting compression-rolls, of fixed arched guides on opposite sides thereof, independently-movable frames fitted to said guides, side pressure-rolls journaled individually in said frames, separate pressure devices for the frames, and means for adjusting and confining one frame and its roll in inoperative relation to the compression-rolls, substantially as described.

In testimony that I claim the foregoing as my own I have hereto affixed my signature in the presence of two witnesses.

RICHARD R. PACE.

Witnesses:
J. H. KIRKPATRICK,
O. P. BAILEY.